Sept. 25, 1923.  1,469,071
R. COLOMBINO
WIND SCREEN FOR MOTOR VEHICLES
Filed Aug. 7, 1922
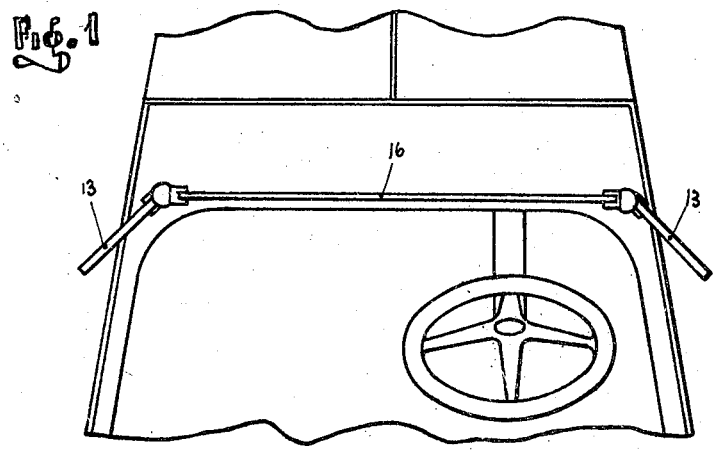
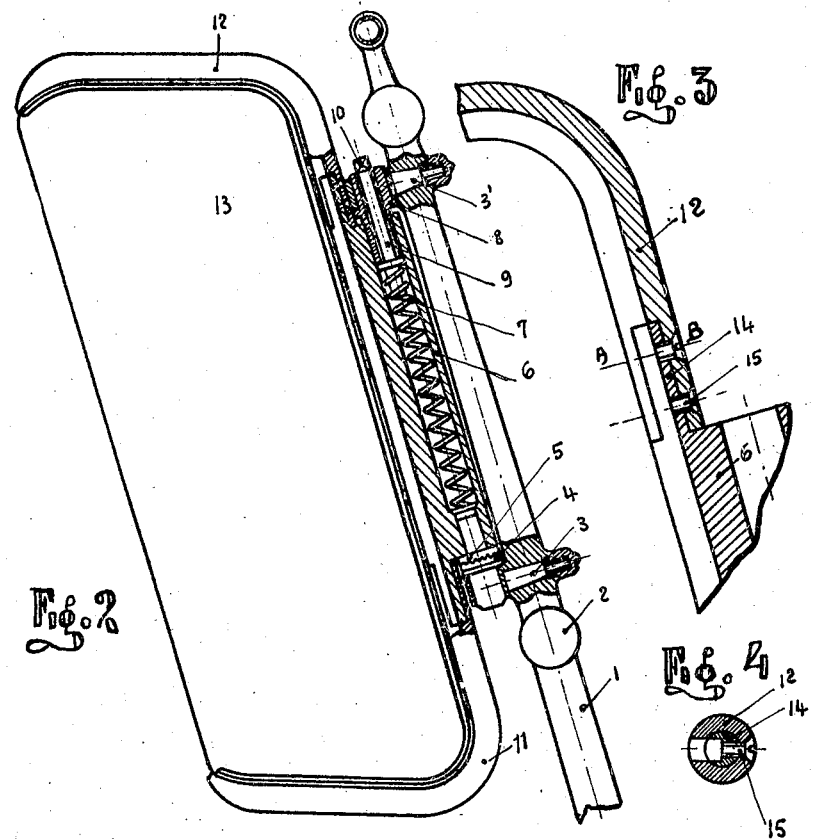
Inventor
Rino Colombino
By Henry Orth Jr. Atty Patented Sept. 25, 1923.

1,469,071

UNITED STATES PATENT OFFICE.

RINO COLOMBINO, OF TURIN, ITALY.

WIND SCREEN FOR MOTOR VEHICLES.

Application filed August 7, 1922. Serial No. 580,180.

*To all whom it may concern:*

Be it known that I, RINO COLOMBINO, engineer, a subject of the King of Italy, and resident of 26 via Pastrengo, Turin, in the Kingdom of Italy, have invented certain new and useful Improvements in Wind Screens for Motor Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that type of automobile wind screens having hinged or pivoted side wings, and its object is to provide a screen of improved and simplified construction in which the side wings will be automatically retained in any position to which they may be adjusted about their hinges or pivots.

To the attainment of this object the frame of each side wing is built up of component parts which permit rapid and easy mounting and dismounting of the glass or equivalent, one of said parts constituting a hinge piece and being equipped with a serrated clutch member adapted resiliently to engage a corresponding fixed clutch member, whereby the side wing can be easily turned by hand about its hinge to any desired position and will remain in that position against the action of wind and vibrations owing to the action of the clutch.

Preferably the clutch member carried by the hinge piece of each side wing is pressed into engagement with the corresponding fixed clutch member by a spring housed in the hinge piece and acted on by a screw capable of adjustment to vary the pressure exerted thereby.

The frame of each side wing may comprise three parts, namely an upper part and a lower part having their extremities bent over to retain the glass or equivalent in place and a third part forming the hinge piece, having hinges to engage in openings in other parts and secured by screws or the like so that the upper part at least is removable.

One constructional form of the invention is illustrated by way of example on the accompanying drawing, whereon:

Fig. 1 is a plan view of part of an automobile having a wind screen with two side wings in accordance with the invention.

Fig. 2 is an elevation, partly in section, of one of the side wings showing the manner in which it is mounted.

Fig. 3 is a detail illustrating the union of the parts of the frame of the side wing.

Fig. 4 is a section on the line A—B of Fig. 3.

Referring to the drawings:

1 indicates a support for one side wing fixed to the body or the vehicle and jointed, at 2, so as to be able to take up different inclinations, the said support carrying socket members 3, $3^1$ between which a hinge piece 6 of the side wing frame is accommodated. A serrated clutch member 4 is fixed in the socket 3 and is engaged by a corresponding clutch member 5 slidable in the hinge piece and maintained in engagement by a spring 7 located in the hinge piece and between the member 5 and a pivot 8 turnable in the socket $3^1$. The tension of the spring is regulated by means of a screw 9 disposed in the pivot 8 and provided with a polygonal head 10 to receive a suitable key.

At its lower end the hinge piece 6 is connected to the base part 11 of the side wing frame by screws or solder or in any other suitable manner and at its upper end it is removably connected to the top part 12 of the frame.

As illustrated, the parts 11 and 12 are of circular section with a groove 17 in which is mounted the glass with the interposition of a suitable packing.

Each end of the hinge piece 6 has a tongue 14 which fits in a corresponding hole in the adjacent part 11 or 12. The lower part is then soldered or otherwise permanently fixed in place while the upper part is removably secured by means of screws 15 and may be easily and rapidly dismounted for the purpose of fixing a new glass, when required, which is effected with great facility by simply removing the part 12 then inserting the glass in the parts 11, 6 of the frame and again securing the part 12 in place. When the said part is in place the glass 13 is retained by the folded extremities 18, 19 of the parts 11 and 12.

The wind screen has two side wings mounted as described and so that they may be swung round, simply by pressure of the hand, in one direction or the other against the action of their springs 7 on the clutches 4, 5.

The pressure exerted by the springs is so regulated as to prevent the wings being displaced by air pressure or by vibration whilst allowing of their being turned by hand.

What I claim is:

The combination with a wind screen for motor cars, of side wings for the screen, each comprising a tubular intermediate hinge piece, a glass supporting frame detachably secured to one end of the hinge piece, a glass supporting frame fixed to the other end of said piece, sockets secured to the upright member of the wind screen at opposite ends of the hinge piece, an internally threaded tubular pin mounted in and connecting one end of the hinge piece with one of the sockets, a serrated clutch face on the other socket, a connecting pin slidably mounted in the other end of the hinge piece and having a serrated clutch portion cooperating with the clutch face on the socket, a spiral spring mounted on the hinge piece between the connecting pins, and a screw in the tubular pin adapted to adjust the tension of the spring.

In testimony that I claim the foregoing as my invention, I have signed my name.

RINO COLOMBINO.